(12) United States Patent
Kuo et al.

(10) Patent No.: US 12,118,704 B2
(45) Date of Patent: Oct. 15, 2024

(54) MODEL INPUT SIZE DETERMINATION METHOD, ELECTRONIC DEVICE AND STORAGE MEDIUM

(71) Applicant: HON HAI PRECISION INDUSTRY CO., LTD., New Taipei (TW)

(72) Inventors: Chin-Pin Kuo, New Taipei (TW); Shih-Chao Chien, New Taipei (TW); Tung-Tso Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 557 days.

(21) Appl. No.: 17/526,325

(22) Filed: Nov. 15, 2021

(65) Prior Publication Data

US 2022/0198645 A1 Jun. 23, 2022

(30) Foreign Application Priority Data

Dec. 22, 2020 (CN) .......................... 202011527502.1

(51) Int. Cl.
| | |
|---|---|
| G06T 9/00 | (2006.01) |
| G06T 7/00 | (2017.01) |
| G06T 7/143 | (2017.01) |
| G06V 10/75 | (2022.01) |

(52) U.S. Cl.
CPC ............ *G06T 7/0004* (2013.01); *G06T 7/143* (2017.01); *G06T 9/00* (2013.01); *G06V 10/751* (2022.01); *G06T 2207/30108* (2013.01)

(58) Field of Classification Search
CPC ......... G06T 7/0004; G06T 7/143; G06T 9/00; G06T 2207/30108; G06T 7/0008; G06T 7/11; G06T 7/60; G06T 2207/10004; G06V 10/751; G06V 30/1823; G06F 18/213

USPC .......................................... 382/141
See application file for complete search history.

(56) References Cited

U.S. PATENT DOCUMENTS

| | | | |
|---|---|---|---|
| 10,653,330 B2* | 5/2020 | Angle | A61B 5/24 |
| 2019/0287230 A1* | 9/2019 | Lu | G06N 3/088 |
| 2020/0273210 A1* | 8/2020 | Nguyen | G06F 30/398 |
| 2020/0279389 A1* | 9/2020 | McIver | G06T 7/12 |

* cited by examiner

*Primary Examiner* — Sheela C Chawan
(74) *Attorney, Agent, or Firm* — ScienBiziP, P.C.

(57) ABSTRACT

A model input size determination method, an electronic device and a storage medium are provided, the method includes acquiring a plurality of test images and a defect result; and encoding each test image to obtain an encoding vector. The encoding vector is decoded to obtain a reconstructed image, then a reconstruction error and a plurality of sub-vectors are calculated; the plurality of sub-vectors is inputted into a Gaussian mixture model, then a plurality of sub-probabilities, an estimated probability and a test error are determined; a detection result in the test image according to the test error and the corresponding error threshold are obtained; an accuracy according to the detection result and the defect result are determined, and an input size is selected from the plurality of preset sizes according to the accuracy. An accuracy of defect detection in manufacturing can be improved.

20 Claims, 2 Drawing Sheets

MODEL INPUT SIZE DETERMINATION METHOD, ELECTRONIC DEVICE AND STORAGE MEDIUM

FIELD

The present disclosure relates to a technical field of quality control in manufacturing, specifically to a model input size determination method, an electronic device and a storage medium.

BACKGROUND

To maintain quality of an industrial product, the industrial product must be inspected for defects before being packaged. In the overall detection, when the defects in the product are relatively subtle, it can be very difficult to detect such defects, thereby reducing accuracy of defect detection.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the model input size determination method of the present disclosure is applied to one or more electronic devices. The electronic device includes hardware such as, but not limited to, a microprocessor and an Application Specific Integrated Circuit (ASIC), Field-Programmable Gate Array (FPGA), Digital Signal Processor (DSP), embedded devices, etc.

The electronic device may be a device such as a desktop computer, a notebook, a palmtop computer, or a cloud server. The electronic device can interact with users through a keyboard, a mouse, a remote control, a touch panel, or a voice control device.

Figure 1:
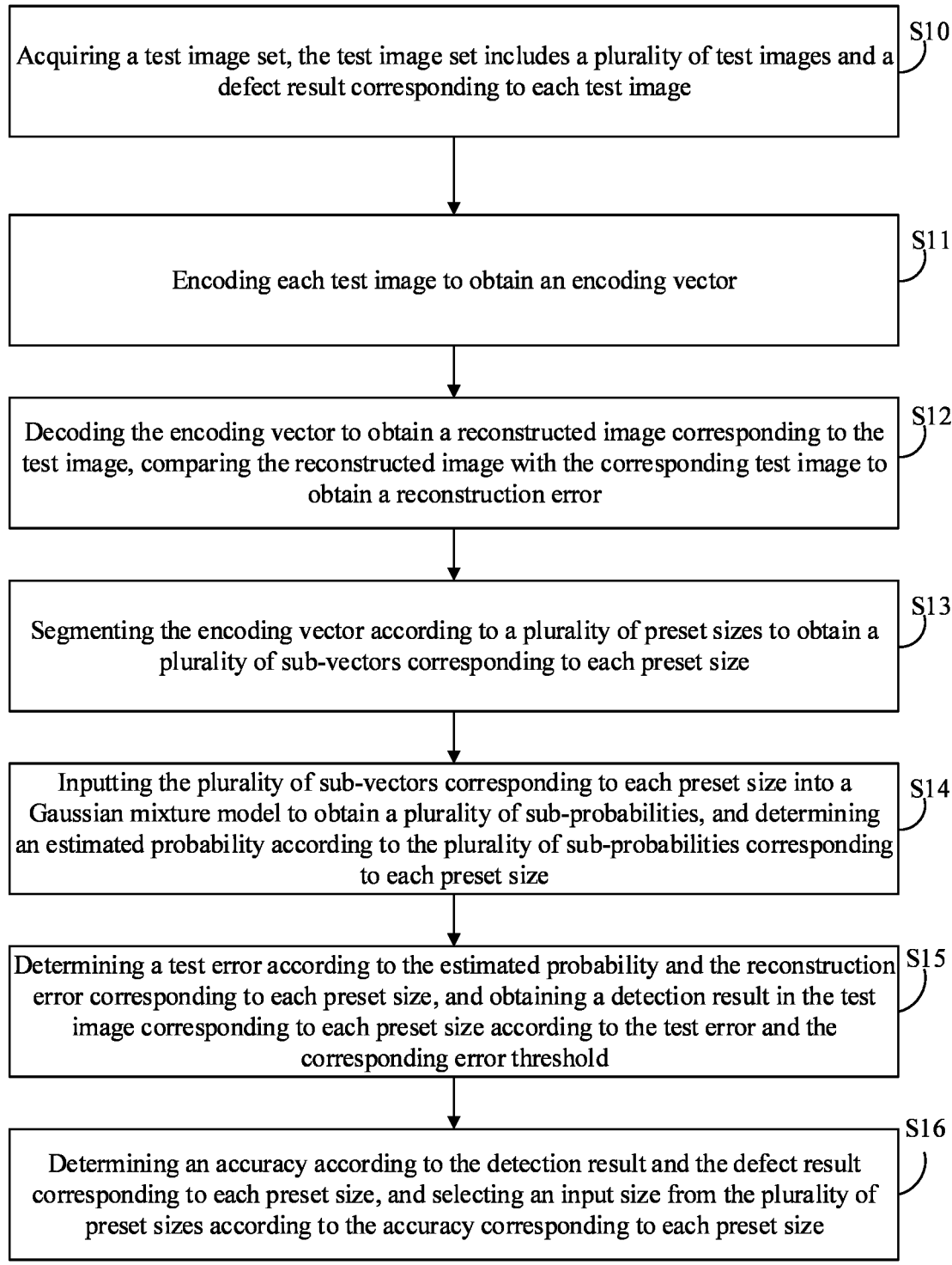
FIG. 1 shows a flowchart of a model input size determination method in an embodiment of the present disclosure.

FIG. 1 is a flowchart of a model input size determination method in an embodiment of the present disclosure. The model input size determination method is applied to electronic devices and uses for determining size of images suitable for model input. According to different needs, the order of the steps in the flowchart can be changed, and some can be omitted.

In block S10, acquiring a test image set, the test image set includes a plurality of test images and a defect result corresponding to each test image.

A test image includes a detected object (a product as an object, or images of the product, or both), and the defect result is that the test image reveals one or more defects or that no defects are revealed in the test image.

In at least one embodiment of the present disclosure, the test image set can be acquired from a test library, and the test images stored in the test library are images of products that have undergone defect detection.

In block S11, encoding each test image to obtain an encoding vector.

In at least one embodiment of the present disclosure, an encoder can be used to encode each test image. The encoder may be an encoder in an autoencoder. The encoder includes a plurality of hidden layers (that is, non-visible layers), and the number of hidden layers can be arbitrarily set.

In at least one embodiment of the present disclosure, wherein encoding each test image to obtain an encoding vector includes: performing a vectorization process on each test image to obtain a feature vector; acquiring a hidden layer in the encoder; calculating the feature vector through the acquired hidden layer to obtain the encoding vector.

The acquired hidden layer in the encoder can be any hidden layer.

In at least one embodiment of the present disclosure, wherein calculating the feature vector through the acquired hidden layer to obtain the encoding vector includes: acquiring a weighting matrix and an offset value of the acquired hidden layer; multiplying the feature vector and the weighting matrix to obtain an operation result and adding the operation result and the offset value to obtain the encoding vector.

In block S12, decoding the encoding vector to obtain a reconstructed image corresponding to the test image, comparing the reconstructed image with the corresponding test image to obtain a reconstruction error.

In at least one embodiment of the present disclosure, a decoder can be used to decode the encoding vector. The decoder may be a decoder corresponding to the encoder in the autoencoder. In other embodiments, the encoding vector can be converted into the reconstructed image through a vector mapping table, therefore, the reconstruction error refers to an error of converting the test image into the encoding vector, that is, an error generated during reconstruction of the test image.

In at least one embodiment of the present disclosure, wherein decoding the encoding vector to obtain a reconstructed image corresponding to the test image includes: obtaining the vector mapping table; mapping the encoding vector into a plurality of reconstructed pixels according to the vector mapping table; generating the reconstructed image according to the plurality of reconstructed pixels.

The vector mapping table stores a mapping relationship between vectors and pixels.

Through the vector mapping table, the reconstructed image can be accurately generated.

In at least one embodiment of the present disclosure, wherein comparing the reconstructed image with the corresponding test image to obtain a reconstruction error includes: acquiring a test pixel point corresponding to each reconstructed pixel from the test image; comparing each reconstructed pixel with the corresponding test pixel and when a comparison result is that a reconstructed pixel is different from the corresponding test pixel; calculating a number of differences between the reconstructed pixel and the corresponding test pixel as being a first number; calculating a total number of the plurality of reconstructed pixels as being a second number; obtaining the reconstruction error by dividing the first number by the second number.

By determining the reconstruction error, the error of converting the test image into the encoding vector can be determined, and an error generated before inputting the encoding vector to a model can be determined, thereby avoiding interference with a determination of an input size of the model.

In block S13, segmenting the encoding vector according to a plurality of preset sizes to obtain a plurality of sub-vectors corresponding to each preset size.

In at least one embodiment of the present disclosure, the preset sizes can be a vector with a dimension of 1*1*8, or a vector with a dimension of 2*2*8, and the plurality of preset sizes can be set by users.

In at least one embodiment of the present disclosure, wherein segmenting the encoding vector according to a plurality of preset sizes to obtain a plurality of sub-vectors corresponding to each preset size includes: using each preset size to sequentially segment the encoding vector to obtain a plurality of sub-vectors corresponding to each preset size.

For example, suppose the encoding vector is a vector with a dimension of 3*3*3, and a preset size is a vector with a dimension of 1*1*3, when the vector with a dimension of 3*3*3 is segmented in order according to the vector with a dimension of 1*1*3, 9 sub-vectors with a dimension of 1*1*3 are obtained.

In block S14, inputting the plurality of sub-vectors corresponding to each preset size into a Gaussian mixture model to obtain a plurality of sub-probabilities, and determining an estimated probability according to the plurality of sub-probabilities corresponding to each preset size.

In at least one embodiment of the present disclosure, the Gaussian mixture model refers to an open source mixture model, and the Gaussian mixture model includes a plurality of single Gaussian models.

In at least one embodiment of the present disclosure, wherein inputting the plurality of sub-vectors corresponding to each preset size into a Gaussian mixture model to obtain a plurality of sub-probabilities, and determining an estimated probability according to the plurality of sub-probabilities corresponding to each preset size includes: acquiring a feature distribution and a mixing coefficient in the Gaussian mixture model; determining an average value and a covariance according to the feature distribution; determining a plurality of sub-probabilities according to the plurality of sub-vectors, the mixing coefficient, the average value, and the covariance corresponding to each preset size, and determining the estimated probability corresponding to each preset size by multiplying the plurality of sub-probabilities.

By combining the probabilities of the plurality of sub-vectors, the estimated probability with plurality of sub-vectors can be determined.

In block S15, determining a test error according to the estimated probability and the reconstruction error corresponding to each preset size, and obtaining a detection result in the test image corresponding to each preset size according to the test error and the corresponding error threshold.

In at least one embodiment of the present disclosure, the detection result is that the test image reveals one or more defects or that no defects are revealed in the test image.

In at least one embodiment of the present disclosure, the error threshold is determined based on a plurality of positive sample images.

In at least one embodiment of the present disclosure, wherein determining a test error according to the estimated probability and the reconstruction error corresponding to each preset size includes: calculating a logarithmic value of each estimated probability; calculating a weighted sum of an opposite value of the logarithmic value and the corresponding reconstruction error to obtain the test error corresponding to each preset size.

For example, assuming that an estimated probability is 0.001, and a reconstruction error is 0.03, a logarithmic value of the estimated probability 0.001 is log (0.001)=−3. An opposite value of the logarithmic value "−3" is three (3). For calculating a weighted sum of the opposite value 3 and the reconstruction error 0.03, the weighted sum is 3.03. When a ratio between the estimated probability and the sample error is 10%, and a ratio between the reconstruction error and the sample error is 90%, the calculated sample error is: 3*10%+0.03*90%=0.327.

In at least one embodiment of the present disclosure, wherein obtaining a detection result in the test image corresponding to each preset size according to the test error and the corresponding error threshold includes: determining that the detection result is that there are one or more defects in the test image when the test error is less than the corresponding error threshold and determining that the detection result is that there are no defects in the test image when the test error is greater than or equal to the corresponding error threshold.

By comparing the test error with the corresponding error threshold, a simple numerical comparison between the test error and the corresponding error threshold is realized. Therefore, detection of subtle defects in the test image of the product can be achieved, improving an accuracy of defect detection.

In block S16, determining an accuracy according to the detection result and the defect result corresponding to each preset size, and selecting an input size from the plurality of preset sizes according to the accuracy corresponding to each preset size.

In at least one embodiment of the present disclosure, the input size refers to a vector input to the Gaussian mixture model for probability determination.

In at least one embodiment of the present disclosure, wherein determining an accuracy according to the detection result and the defect result corresponding to each preset size, and selecting an input size from the plurality of preset sizes according to the accuracy corresponding to each preset size includes: for each preset size, determining the detection result that is the same as the defect result as a target result; calculating a target number of the target results, and calculating a total number of the detection results; obtaining the accuracy corresponding to each preset size by dividing the target number by the total number; determining the preset size corresponding to a maximum accuracy as the input size.

For example: assuming that a preset size X is 1*1*8, a preset size Y is 2*2*8, a preset size Z is 4*4*8, and there are 3 target results that are the same as the defect result in detection results corresponding to the preset size X, there are 6 target results that are the same as the defect result in detection results corresponding to the preset size Y, there are 10 target results that are the same as the defect result in detection results corresponding to the preset size Z, a calculated accuracy corresponding to the preset size X is 25%, a calculated accuracy corresponding to the preset size Y is 50%, a calculated accuracy corresponding to the preset size Z is 83.3%. Since 83.3% is the maximum, the preset size Z corresponding to 83.3% is determined as the input size.

By determining the preset size with the highest accuracy as the input size, accuracy of defect detection is improved.

The present disclosure improves the accuracy of the defect detection by presenting a model for optimal size of an image (resolution of the image) in relation to defect detection.

Figure 2:
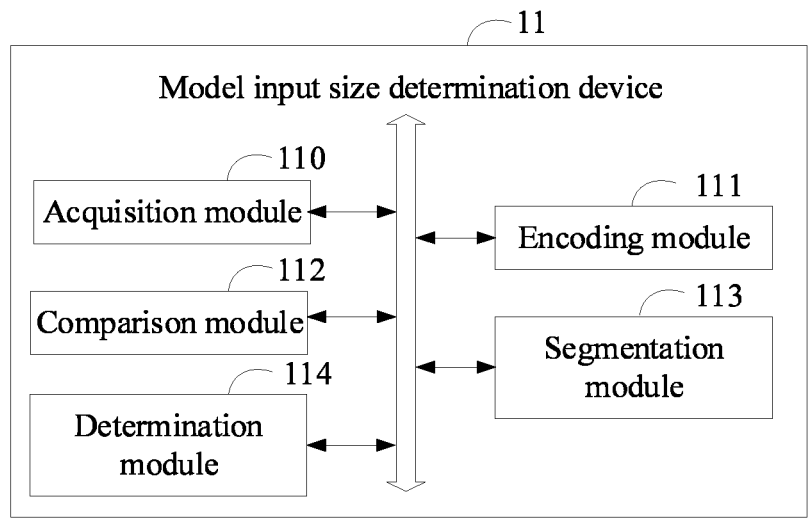
FIG. 2 shows a schematic structural diagram of a model input size determination device provided in an embodiment of the present disclosure.

FIG. 2 shows a schematic structural diagram of a model input size determination device in one embodiment of the present disclosure.

In some embodiments, the model input size determination device 11 (Hereafter referred to as "determination device") runs in an electronic device. The determination device 11 presenting size of images can include a plurality of function modules consisting of program code segments. The program code of each program code segments in the model input size determination device 11 can be stored in a memory and executed by at least one processor to perform determining size of images suitable for model input (described in detail in FIG. 2).

As shown in FIG. 2, the model input size determination device 11 can include: an acquisition module 110, an encoding module 111, a comparison module 112, a segmentation module 113, and a determination module 114. A module as referred to in the present disclosure refers to one of a series of computer-readable instruction segments that can be executed by at least one processor and that are capable of performing fixed functions, which are stored in a memory. In some embodiment, the functions of each module will be detailed.

The above-mentioned integrated unit implemented in a form of software functional modules can be stored in a non-transitory readable storage medium. The above software function modules are stored in a storage medium and include several instructions for causing an electronic device (which can be a personal computer, a dual-screen device, or a network device) or a processor to execute the method described in various embodiments in the present disclosure.

The acquisition module 110 acquires a test image set, the test image set includes a plurality of test images and a defect result corresponding to each test image.

A test image includes a detected object (a product as an object, or images of the product, or both), and the defect result is that the test image reveals one or more defects or that no defects are revealed in the test image.

In at least one embodiment of the present disclosure, the test image set can be acquired from a test library, and the test images stored in the test library are images of products that have undergone defect detection.

The encoding module 111 encodes each test image to obtain an encoding vector.

In at least one embodiment of the present disclosure, an encoder can be used to encode each test image. The encoder may be an encoder in an autoencoder. The encoder includes a plurality of hidden layers (that is, non-visible layers), and a number of hidden layers can be arbitrarily set.

In at least one embodiment of the present disclosure, the encoding module 111 encoding each test image to obtain an encoding vector includes: performing a vectorization process on each test image to obtain a feature vector; acquiring a hidden layer in the encoder; calculating the feature vector through the acquired hidden layer to obtain the encoding vector.

The acquired hidden layer in the encoder can be any hidden layer.

In at least one embodiment of the present disclosure, wherein calculating the feature vector through the acquired hidden layer to obtain the encoding vector includes: acquiring a weighting matrix and an offset value of the acquired hidden layer; multiplying the feature vector and the weighting matrix to obtain an operation result and adding the operation result and the offset value to obtain the encoding vector.

The comparison module 112 decodes the encoding vector to obtain a reconstructed image corresponding to the test image, compares the reconstructed image with the corresponding test image to obtain a reconstruction error.

In at least one embodiment of the present disclosure, a decoder can be used to decode the encoding vector. The decoder may be a decoder corresponding to the encoder in the autoencoder. In other embodiments, the encoding vector can be converted into the reconstructed image through a vector mapping table, therefore, the reconstruction error refers to an error of converting the test image into the encoding vector, that is, an error generated during reconstruction of the test image.

In at least one embodiment of the present disclosure, wherein decoding the encoding vector to obtain a reconstructed image corresponding to the test image includes: obtaining the vector mapping table; mapping the encoding vector into a plurality of reconstructed pixels according to the vector mapping table; generating the reconstructed image according to the plurality of reconstructed pixels.

The vector mapping table stores a mapping relationship between vectors and pixels.

Through the vector mapping table, the reconstructed image can be accurately generated.

In at least one embodiment of the present disclosure, the comparison module 112 comparing the reconstructed image with the corresponding test image to obtain a reconstruction error includes: acquiring a test pixel point corresponding to each reconstructed pixel from the test image; comparing each reconstructed pixel with the corresponding test pixel and when a comparison result is that a reconstructed pixel is different from the corresponding test pixel; calculating a number of differences between the reconstructed pixel and the corresponding test pixel as being a first number; calculating a total number of the plurality of reconstructed pixels as being a second number; obtaining the reconstruction error by dividing the first number by the second number.

By determining the reconstruction error, the error of converting the test image into the encoding vector can be determined, and an error generated before inputting the encoding vector to a model can be determined, thereby avoiding interference with a determination of an input size of the model.

The segmentation module 113 segments the encoding vector according to a plurality of preset sizes to obtain a plurality of sub-vectors corresponding to each preset size.

In at least one embodiment of the present disclosure, the preset sizes can be a vector with a dimension of 1*1*8, or a vector with a dimension of 2*2*8, and the plurality of preset sizes can be set by users.

In at least one embodiment of the present disclosure, the segmentation module 113 segmenting the encoding vector according to a plurality of preset sizes to obtain a plurality of sub-vectors corresponding to each preset size includes: using each preset size to sequentially segment the encoding vector to obtain a plurality of sub-vectors corresponding to each preset size.

For example, suppose the encoding vector is a vector with a dimension of 3*3*3, and a preset size is a vector with a dimension of 1*1*3, when the vector with a dimension of 3*3*3 is segmented in order according to the vector with a dimension of 1*1*3, 9 sub-vectors with a dimension of 1*1*3 are obtained.

The determination module 114 inputs the plurality of sub-vectors corresponding to each preset size into a Gaussian mixture model to obtain a plurality of sub-probabilities, and determines an estimated probability according to the plurality of sub-probabilities corresponding to each preset size.

In at least one embodiment of the present disclosure, the Gaussian mixture model refers to an open source mixture model, and the Gaussian mixture model includes a plurality of single Gaussian models.

In at least one embodiment of the present disclosure, the determination module 114 inputting the plurality of sub-vectors corresponding to each preset size into a Gaussian mixture model to obtain a plurality of sub-probabilities, and determining an estimated probability according to the plurality of sub-probabilities corresponding to each preset size includes: acquiring a feature distribution and a mixing coefficient in the Gaussian mixture model; determining an average value and a covariance according to the feature distribution; determining a plurality of sub-probabilities according to the plurality of sub-vectors, the mixing coefficient, the average value, and the covariance corresponding to each preset size, and determining the estimated probability corresponding to each preset size by multiplying the plurality of sub-probabilities.

By combining the probabilities of the plurality of sub-vectors, the estimated probability with plurality of sub-vectors can be determined.

The determination module 114 determines a test error according to the estimated probability and the reconstruction error corresponding to each preset size, and obtains a detection result in the test image corresponding to each preset size according to the test error and the corresponding error threshold.

In at least one embodiment of the present disclosure, the detection result is that the test image reveals one or more defects or that no defects are revealed in the test image.

In at least one embodiment of the present disclosure, the error threshold is determined based on a plurality of positive sample images.

In at least one embodiment of the present disclosure, the determination module 114 determines a test error according to the estimated probability and the reconstruction error corresponding to each preset size includes: calculating a logarithmic value of each estimated probability; calculating a weighted sum of an opposite value of the logarithmic value and the corresponding reconstruction error to obtain the test error corresponding to each preset size.

For example, assuming that an estimated probability is 0.001, and a reconstruction error is 0.03, a logarithmic value of the estimated probability 0.001 is log (0.001)=−3. An opposite value of the logarithmic value "−3" is three (3). For calculating a weighted sum of the opposite value 3 and the reconstruction error 0.03, the weighted sum is 3.03. When a ratio between the estimated probability and the sample error is 10%, and a ratio between the reconstruction error and the sample error is 90%, the calculated sample error is: 3*10%+ 0.03*90%=0.327.

In at least one embodiment of the present disclosure, the determination module 114 obtaining a detection result in the test image corresponding to each preset size according to the test error and the corresponding error threshold includes: determining that the detection result is that there are one or more defects in the test image when the test error is less than the corresponding error threshold and determining that the detection result is that there are no defects in the test image when the test error is greater than or equal to the corresponding error threshold.

By comparing the test error with the corresponding error threshold, a simple numerical comparison between the test error and the corresponding error threshold is realized. Therefore, detection of subtle defects in the test image of the product can be achieved, improving an accuracy of defect detection.

The determination module 114 determines an accuracy according to the detection result and the defect result corresponding to each preset size and selects an input size from the plurality of preset sizes according to the accuracy corresponding to each preset size.

In at least one embodiment of the present disclosure, the input size refers to a vector input to the Gaussian mixture model for probability determination.

In at least one embodiment of the present disclosure, the determination module 114 determining an accuracy according to the detection result and the defect result corresponding to each preset size, and selecting an input size from the plurality of preset sizes according to the accuracy corresponding to each preset size includes: for each preset size, determining the detection result that is the same as the defect result as a target result; calculating a target number of the target results, and calculating a total number of the detection results; obtaining the accuracy corresponding to each preset size by dividing the target number by the total number; determining the preset size corresponding to a maximum accuracy as the input size.

For example: assuming that a preset size X is 1*1*8, a preset size Y is 2*2*8, a preset size Z is 4*4*8, and there are 3 target results that are the same as the defect result in detection results corresponding to the preset size X, there are 6 target results that are the same as the defect result in detection results corresponding to the preset size Y, there are 10 target results that are the same as the defect result in detection results corresponding to the preset size Z, a calculated accuracy corresponding to the preset size X is 25%, a calculated accuracy corresponding to the preset size Y is 50%, a calculated accuracy corresponding to the preset size Z is 83.3%. Since 83.3% is the maximum, the preset size Z corresponding to 83.3% is determined as the input size.

By determining the preset size with the highest accuracy as the input size, accuracy of defect detection is improved.

The present disclosure improves the accuracy of the defect detection by presenting a model for optimal size of an image (resolution of the image) in relation to defect detection.

The embodiment also provides a non-transitory readable storage medium having computer-readable instructions stored therein. The computer-readable instructions are executed by a processor to implement the steps in the above-mentioned method for model input size determination method, such as in steps in blocks S10-S16 shown in FIG. 1:

In block S10, acquiring a test image set, the test image set includes a plurality of test images and a defect result corresponding to each test image;

In block S11, encoding each test image to obtain an encoding vector;

In block S12, decoding the encoding vector to obtain a reconstructed image corresponding to the test image, comparing the reconstructed image with the corresponding test image to obtain a reconstruction error;

In block S13, segmenting the encoding vector according to a plurality of preset sizes to obtain a plurality of sub-vectors corresponding to each preset size;

In block S14, inputting the plurality of sub-vectors corresponding to each preset size into a Gaussian mixture model to obtain a plurality of sub-probabilities, and determining an estimated probability according to the plurality of sub-probabilities corresponding to each preset size;

In block S15, determining a test error according to the estimated probability and the reconstruction error corresponding to each preset size, and obtaining a detection result in the test image corresponding to each preset size according to the test error and the corresponding error threshold;

In block S16, determining an accuracy according to the detection result and the defect result corresponding to each preset size, and selecting an input size from the plurality of preset sizes according to the accuracy corresponding to each preset size.

The computer-readable instructions are executed by the processor to realize the functions of each module/unit in the above-mentioned device embodiments, such as the modules 110-114 in FIG. 2:

The acquisition module 110 acquires a test image set, the test image set includes a plurality of test images and a defect result corresponding to each test image;

The encoding module 111 encodes each test image to obtain an encoding vector;

The comparison module 112 decodes the encoding vector to obtain a reconstructed image corresponding to the test image, compares the reconstructed image with the corresponding test image to obtain a reconstruction error;

The segmentation module 113 segments the encoding vector according to a plurality of preset sizes to obtain a plurality of sub-vectors corresponding to each preset size;

The determination module 114 inputs the plurality of sub-vectors corresponding to each preset size into a Gaussian mixture model to obtain a plurality of sub-probabilities, and determines an estimated probability according to the plurality of sub-probabilities corresponding to each preset size;

The determination module 114 determines a test error according to the estimated probability and the reconstruction error corresponding to each preset size, and obtains a detection result in the test image corresponding to each preset size according to the test error and the corresponding error threshold;

The determination module 114 determines an accuracy according to the detection result and the defect result corresponding to each preset size, and selects an input size from the plurality of preset sizes according to the accuracy corresponding to each preset size.

Figure 3:
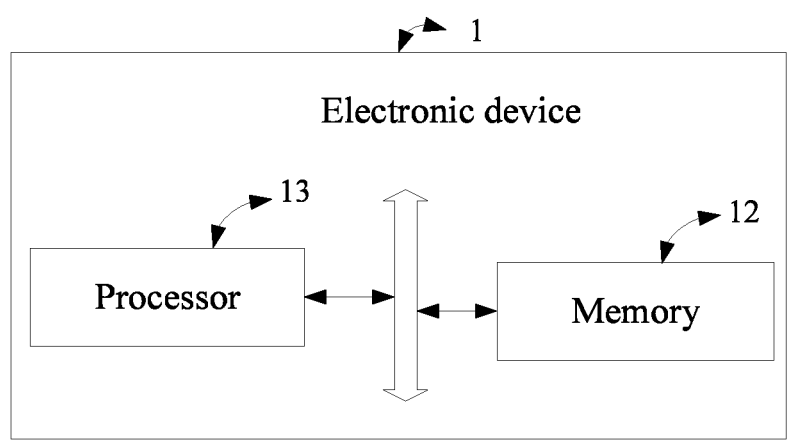
FIG. 3 shows a schematic structural diagram of an electronic device housing the determination device in an embodiment of the present disclosure.

FIG. 3 is a schematic structural diagram of an electronic device provided in an embodiment of the present disclosure. The electronic device 1 may include: a memory 12, at least one processor 13, and computer-readable instructions stored in the memory 12 and executable on the at least one processor 13, for example, image recognition programs. The processor 13 executes the computer-readable instructions to implement the steps in the embodiment of the model input size determination method, such as in steps in block S10-S16 shown in FIG. 1. Alternatively, the processor 13 executes the computer-readable instructions to implement the functions of the modules/units in the foregoing device embodiments, such as the modules 110-114 in FIG. 2.

For example, the computer-readable instructions can be divided into one or more modules/units, and the one or more modules/units are stored in the memory 12 and executed by the at least one processor 13. The one or more modules/units can be a series of computer-readable instruction segments capable of performing specific functions, and the instruction segments are used to describe execution processes of the computer-readable instructions in the electronic device 1. For example, the computer-readable instruction can be divided into the acquisition module 110, the encoding module 111, the comparison module 112, the segmentation module 113, and the determination module 114 as in FIG. 2.

The electronic device 1 can be an electronic device such as a desktop computer, a notebook, a palmtop computer, and a cloud server. Those skilled in the art will understand that the schematic diagram 3 is only an example of the electronic device 1 and does not constitute a limitation on the electronic device 1. Another electronic device 1 may include more or fewer components than shown in the figures or may combine some components or have different components. For example, the electronic device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the electronic device 1 and connects various parts of the entire electronic device 1 by using various interfaces and lines.

The memory 12 can be configured to store the computer-readable instructions and/or modules/units. The processor 13 may run or execute the computer-readable instructions and/or modules/units stored in the memory 12 and may call up data stored in the memory 12 to implement various functions of the electronic device 1. The memory 12 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the electronic device 1. In addition, the memory 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the electronic device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset application, the disclosed electronic device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A model input size determination method, the method comprising:
    acquiring a test image set, the test image set includes a plurality of test images and a defect result corresponding to each test image;
    encoding each test image to obtain an encoding vector;
    decoding the encoding vector to obtain a reconstructed image corresponding to the test image, comparing the reconstructed image with the corresponding test image to obtain a reconstruction error;
    segmenting the encoding vector according to a plurality of preset sizes to obtain a plurality of sub-vectors corresponding to each preset size;
    inputting the plurality of sub-vectors corresponding to each preset size into a Gaussian mixture model to obtain a plurality of sub-probabilities, and determining an estimated probability according to the plurality of sub-probabilities corresponding to each preset size;
    determining a test error according to the estimated probability and the reconstruction error corresponding to each preset size, and obtaining a detection result in the test image corresponding to each preset size according to the test error and the corresponding error threshold;
    determining an accuracy according to the detection result and the defect result corresponding to each preset size, and selecting an input size from the plurality of preset sizes according to the accuracy corresponding to each preset size.

2. The model input size determination method of claim 1, wherein decoding the encoding vector to obtain a reconstructed image corresponding to the test image comprises:
    obtaining the vector mapping table;
    mapping the encoding vector into a plurality of reconstructed pixels according to the vector mapping table;
    generating the reconstructed image according to the plurality of reconstructed pixels.

3. The model input size determination method of claim 2, wherein comparing the reconstructed image with the corresponding test image to obtain a reconstruction error comprises:
    acquiring a test pixel point corresponding to each reconstructed pixel from the test image;
    comparing each reconstructed pixel with the corresponding test pixel and when a comparison result is that a reconstructed pixel is different from the corresponding test pixel;
    calculating a number of differences between the reconstructed pixel and the corresponding test pixel as being a first number;
    calculating a total number of the plurality of reconstructed pixels as being a second number;
    obtaining the reconstruction error by dividing the first number by the second number.

4. The model input size determination method of claim 1, wherein segmenting the encoding vector according to a plurality of preset sizes to obtain a plurality of sub-vectors corresponding to each preset size comprises:
    using each preset size to sequentially segment the encoding vector to obtain a plurality of sub-vectors corresponding to each preset size.

5. The model input size determination method of claim 1, wherein inputting the plurality of sub-vectors corresponding to each preset size into a Gaussian mixture model to obtain a plurality of sub-probabilities, and determining an estimated probability according to the plurality of sub-probabilities corresponding to each preset size comprises:
    acquiring a feature distribution and a mixing coefficient in the Gaussian mixture model;
    determining an average value and a covariance according to the feature distribution;
    determining a plurality of sub-probabilities according to the plurality of sub-vectors, the mixing coefficient, the average value, and the covariance corresponding to each preset size;
    determining the estimated probability corresponding to each preset size by multiplying the plurality of sub-probabilities.

6. The model input size determination method of claim 1, wherein determining a test error according to the estimated probability and the reconstruction error corresponding to each preset size comprises:

calculating a logarithmic value of each estimated probability;
calculating a weighted sum of an opposite value of the logarithmic value and the corresponding reconstruction error to obtain the test error corresponding to each preset size.

7. The model input size determination method of claim 1, wherein determining an accuracy according to the detection result and the defect result corresponding to each preset size, and selecting an input size from the plurality of preset sizes according to the accuracy corresponding to each preset size comprises:
for each preset size, determining the detection result that is the same as the defect result as a target result;
calculating a target number of the target results, and calculating a total number of the detection results;
obtaining the accuracy corresponding to each preset size by dividing the target number by the total number;
determining the preset size corresponding to a maximum accuracy as the input size.

8. An electronic device comprising a memory and a processor, the memory stores at least one computer-readable instruction, which when executed by the processor causes the processor to:
acquire a test image set, the test image set includes a plurality of test images and a defect result corresponding to each test image;
encode each test image to obtain an encoding vector;
decode the encoding vector to obtain a reconstructed image corresponding to the test image and compare the reconstructed image with the corresponding test image to obtain a reconstruction error;
segment the encoding vector according to a plurality of preset sizes to obtain a plurality of sub-vectors corresponding to each preset size;
input the plurality of sub-vectors corresponding to each preset size into a Gaussian mixture model to obtain a plurality of sub-probabilities, and determine an estimated probability according to the plurality of sub-probabilities corresponding to each preset size;
determine a test error according to the estimated probability and the reconstruction error corresponding to each preset size, and obtain a detection result in the test image corresponding to each preset size according to the test error and the corresponding error threshold;
determine an accuracy according to the detection result and the defect result corresponding to each preset size and select an input size from the plurality of preset sizes according to the accuracy corresponding to each preset size.

9. The electronic device of claim 8, wherein the processor decodes the encoding vector to obtain a reconstructed image corresponding to the test image by:
obtaining the vector mapping table;
mapping the encoding vector into a plurality of reconstructed pixels according to the vector mapping table;
generating the reconstructed image according to the plurality of reconstructed pixels.

10. The electronic device of claim 9, wherein the processor compares the reconstructed image with the corresponding test image to obtain a reconstruction error by:
acquiring a test pixel point corresponding to each reconstructed pixel from the test image;
comparing each reconstructed pixel with the corresponding test pixel and when a comparison result is that a reconstructed pixel is different from the corresponding test pixel;
calculating a number of differences between the reconstructed pixel and the corresponding test pixel as being a first number;
calculating a total number of the plurality of reconstructed pixels as being a second number;
obtaining the reconstruction error by dividing the first number by the second number.

11. The electronic device of claim 8, wherein the processor segments the encoding vector according to a plurality of preset sizes to obtain a plurality of sub-vectors corresponding to each preset size by:
using each preset size to sequentially segment the encoding vector to obtain a plurality of sub-vectors corresponding to each preset size.

12. The electronic device of claim 8, wherein the processor inputs the plurality of sub-vectors corresponding to each preset size into a Gaussian mixture model to obtain a plurality of sub-probabilities, and determines an estimated probability according to the plurality of sub-probabilities corresponding to each preset size by:
acquiring a feature distribution and a mixing coefficient in the Gaussian mixture model;
determining an average value and a covariance according to the feature distribution;
determining a plurality of sub-probabilities according to the plurality of sub-vectors, the mixing coefficient, the average value, and the covariance corresponding to each preset size;
determining the estimated probability corresponding to each preset size by multiplying the plurality of sub-probabilities.

13. The electronic device of claim 8, wherein the processor determines a test error according to the estimated probability and the reconstruction error corresponding to each preset size by:
calculating a logarithmic value of each estimated probability;
calculating a weighted sum of an opposite value of the logarithmic value and the corresponding reconstruction error to obtain the test error corresponding to each preset size.

14. The electronic device of claim 8, wherein the processor determines an accuracy according to the detection result and the defect result corresponding to each preset size, and selects an input size from the plurality of preset sizes according to the accuracy corresponding to each preset size by:
for each preset size, determining the detection result that is the same as the defect result as a target result;
calculating a target number of the target results, and calculating a total number of the detection results;
obtaining the accuracy corresponding to each preset size by dividing the target number by the total number;
determining the preset size corresponding to a maximum accuracy as the input size.

15. A non-transitory storage medium having stored thereon at least one computer-readable instructions that, when the at least one computer-readable instructions are executed by a processor to implement a model input size determination method:
acquiring a test image set, the test image set includes a plurality of test images and a defect result corresponding to each test image;
encoding each test image to obtain an encoding vector;
decoding the encoding vector to obtain a reconstructed image corresponding to the test image, comparing the reconstructed image with the corresponding test image to obtain a reconstruction error;

segmenting the encoding vector according to a plurality of preset sizes to obtain a plurality of sub-vectors corresponding to each preset size;

inputting the plurality of sub-vectors corresponding to each preset size into a Gaussian mixture model to obtain a plurality of sub-probabilities, and determining an estimated probability according to the plurality of sub-probabilities corresponding to each preset size;

determining a test error according to the estimated probability and the reconstruction error corresponding to each preset size, and obtaining a detection result in the test image corresponding to each preset size according to the test error and the corresponding error threshold;

determining an accuracy according to the detection result and the defect result corresponding to each preset size, and selecting an input size from the plurality of preset sizes according to the accuracy corresponding to each preset size.

16. The non-transitory storage medium of claim 15, wherein decoding the encoding vector to obtain a reconstructed image corresponding to the test image comprises:

obtaining the vector mapping table;

mapping the encoding vector into a plurality of reconstructed pixels according to the vector mapping table;

generating the reconstructed image according to the plurality of reconstructed pixels.

17. The non-transitory storage medium of claim 16, wherein comparing the reconstructed image with the corresponding test image to obtain a reconstruction error comprises:

acquiring a test pixel point corresponding to each reconstructed pixel from the test image;

comparing each reconstructed pixel with the corresponding test pixel and when a comparison result is that a reconstructed pixel is different from the corresponding test pixel;

calculating a number of differences between the reconstructed pixel and the corresponding test pixel as being a first number;

calculating a total number of the plurality of reconstructed pixels as being a second number;

obtaining the reconstruction error by dividing the first number by the second number.

18. The non-transitory storage medium of claim 15, wherein segmenting the encoding vector according to a plurality of preset sizes to obtain a plurality of sub-vectors corresponding to each preset size comprises:

using each preset size to sequentially segment the encoding vector to obtain a plurality of sub-vectors corresponding to each preset size.

19. The non-transitory storage medium of claim 15, wherein inputting the plurality of sub-vectors corresponding to each preset size into a Gaussian mixture model to obtain a plurality of sub-probabilities, and determining an estimated probability according to the plurality of sub-probabilities corresponding to each preset size comprises:

acquiring a feature distribution and a mixing coefficient in the Gaussian mixture model;

determining an average value and a covariance according to the feature distribution;

determining a plurality of sub-probabilities according to the plurality of sub-vectors, the mixing coefficient, the average value, and the covariance corresponding to each preset size;

determining the estimated probability corresponding to each preset size by multiplying the plurality of sub-probabilities.

20. The non-transitory storage medium of claim 15, wherein determining a test error according to the estimated probability and the reconstruction error corresponding to each preset size comprises:

calculating a logarithmic value of each estimated probability;

calculating a weighted sum of an opposite value of the logarithmic value and the corresponding reconstruction error to obtain the test error corresponding to each preset size.

* * * * *